United States Patent [19]
McAuliffe et al.

[11] Patent Number: 6,056,193
[45] Date of Patent: May 2, 2000

[54] COMPUTER KEYBOARD WITH INTEGRAL ENCODED DEVICE READER

[75] Inventors: John McAuliffe, Boherbue; James Singleton, Banteer, both of Ireland; August Mievis, Zoutleeuw, Belgium; David McEvoy, Guildford, United Kingdom

[73] Assignee: Alps Electric (Ireland) Limited, Ireland

[21] Appl. No.: 08/970,975

[22] Filed: Nov. 14, 1997

[30] Foreign Application Priority Data

Nov. 18, 1996 [IE] Ireland ................................. S960815

[51] Int. Cl.⁷ ....................................................... G06K 5/00
[52] U.S. Cl. ........................... 235/380; 235/382; 235/492
[58] Field of Search ..................................... 235/380, 381, 235/379, 491, 492, 493

[56] References Cited

U.S. PATENT DOCUMENTS

| | | | |
|---|---|---|---|
| 4,123,747 | 10/1978 | Lancto et al. ............................. | 235/380 |
| 4,707,592 | 11/1987 | Ware ....................................... | 235/379 |
| 5,340,969 | 8/1994 | Cox ......................................... | 235/381 |
| 5,359,182 | 10/1994 | Schilling ................................. | 235/380 |
| 5,430,263 | 7/1995 | English et al. ...................... | 235/145 R |
| 5,489,773 | 2/1996 | Kumar .................................... | 235/380 |
| 5,501,518 | 3/1996 | Woodward .......................... | 235/145 R |
| 5,557,087 | 9/1996 | Duyck .................................... | 235/380 |
| 5,664,157 | 9/1997 | Takahira et al. ........................ | 235/380 |
| 5,664,228 | 9/1997 | Mital ....................................... | 235/380 |

FOREIGN PATENT DOCUMENTS

| | | |
|---|---|---|
| 0 587 375 A2 | 3/1994 | European Pat. Off. . |
| 0 763 791 A1 | 3/1997 | European Pat. Off. . |
| WO 95/26085 | 9/1995 | WIPO . |

*Primary Examiner*—Thien M. Le
*Assistant Examiner*—Daniel St. Cyr
*Attorney, Agent, or Firm*—Snell & Wilmer L.L.P.

[57] ABSTRACT

The present invention relates to a computer keyboard console with an integral encoded device reader, which may for example be a barcode reader, a magnetic card reader or a "smart card" reader or any generally similar device for reading encoded data, for example a personal identification number (PIN) held on the device which may be inserted into a slot defined by the console. The reader comprises an interface in communication with a dedicated microprocessor in communication with means for erasably storing or validating data such as security or user identity data, the keyboard matrix circuitry, and adapted to communicate with the host CPU via the standard keyboard port connection, and/or via a separate serial connection or interface. Preferably, separate reader interfaces are configured with the dedicated microprocessor to read a barcode device, a magnetic card device, or a smart card device. Means are preferably provided to block the communication of said data when entered via the encoded device reader and/or via keystrokes on the keyboard between the keyboard and the host CPU, and preferably to temporarily disable the host CPU—keyboard interconnection or interface until the validation and/or erasure of said data is complete.

9 Claims, 5 Drawing Sheets

COMPUTER KEYBOARD WITH INTEGRAL ENCODED DEVICE READER

FIELD OF THE INVENTION

The present invention relates to a computer keyboard console with an integral encoded device reader, which may for example be a barcode reader, a magnetic card reader or a "smart card" reader or any generally similar device for reading encoded data, for example a personal identification number (PIN) held on the device which may be inserted into the reader.

BACKGROUND ART

Separate card reader devices including a smart card reader, for interconnection between a computer keyboard console and a personal computer (PC) have been described in the prior art, for example EP-A-0,486,363 (Thomson-CSF). This describes a smart card read/write unit in a self-contained housing with connections to the computer keyboard and a port on the computer. If specific instructions are entered at the keyboard, data may be read from the smart card and written to the smart card. Numerous devices have been described in the prior art relating to point of sale (POS) devices and automatic cash dispenser machines which may include a key pad and a credit, debit or cash card reader with a magnetic strip including encoded PIN data for communication to a remote computer. However, these are mentioned by way of background only and are not directly relevant to the present invention, which is concerned with a keyboard for a personal computer (PC), network computer (NC), or Internet appliance.

The keyboard console is the standard input device on all personal computers and network computers, and it is particularly in a network environment where security of access by individual users becomes important, i.e. controlling access by certain authorised individuals and restricting access to certain software applications by authorised individuals is an important issue. In order to conduct electronic commerce across a network of computers, such as the Internet, smart cards and similar devices are used for example to transfer "digital cash", to make a credit transfer, or to debit an individual's bank account, and these transactions will increasingly be conducted from a PC or NC with the aid of a card reader device.

A security problem exists with many prior art arrangements in that once encoded data such as PIN data is read from the user's card, whether to initially "unlock" further functionality of the card or to validate data subsequently entered, the PIN details are communicated to a host computer or network server, with the possibility of interception, diversion or corruption. In certain cases, it may not be absolutely necessary to transmit the PIN details to the host, in particular for personal identification purposes and for unloading the card's functionality.

SUMMARY OF THE INVENTION

It is an object of the present invention to provide a computer keyboard console with an integral card reader slot, preferably to one side thereof so that the user inserts a card device with encoded data directly into the keyboard.

It is a further object to the present invention to improve the security aspects associated with the transfer of encoded data from the card device to the central processing unit (CPU) of a PC connected to the keyboard, or to a remote computer or network server.

A further object of the present invention is to prevent the transfer of certain encoded data, including PIN data from being communicated to the computer or network, but rather to retain that data locally in the keyboard console device for security and access control applications initiated by normal input from the computer keyboard keys.

According to the present invention there is provided a computer keyboard console including an integral encoded device reader such as a barcode device, a magnetic card device or a smart card device, adapted to be inserted into a slot defined by the console, wherein the reader comprises an interface configured with a dedicated microprocessor in communication with means for erasably storing or validating data such as security or user identity data, and with the keyboard matrix circuitry, and adapted to communicate with the host CPU via the standard keyboard port connection. Said means may be embodied as an erasable programmable read only memory (EPROM), a static random access memory (SRAM), and/or a state machine with no RAM or ROM.

Advantageously, means are provided to block the communication of said data when entered via the encoded device reader and/or via keystrokes on the keyboard between the keyboard and the host CPU. Said blocking means may be provided to temporarily disable the host CPU—keyboard interconnection or interface until the validation and/or erasure of said data is complete. Preferably, when an intelligent encoded data device such as a smart card encoded with a user-defined password is read by the reader and a user is required to enter the password via the keyboard keys to unlock the smart card so that further encoded data may be read by the reader, indicator means on the keyboard is set, and password confirmation is sent directly to the smart card, thereby bypassing the host CPU.

Preferably, separate reader interfaces are configured with the dedicated microprocessor to read different encoded device media selected from a barcode device, a magnetic card device, or a smart card device. Suitably, a cover is provided to cover the slot or slots associated with any redundant reader device not in use.

Preferably, connection with the host CPU is via a universal serial bus interface. Alternatively, an additional serial connection is provided between the dedicated microprocessor and the host CPU.

DETAILED DESCRIPTION OF PREFERRED EMBODIMENTS OF THE INVENTION

Figure 1:
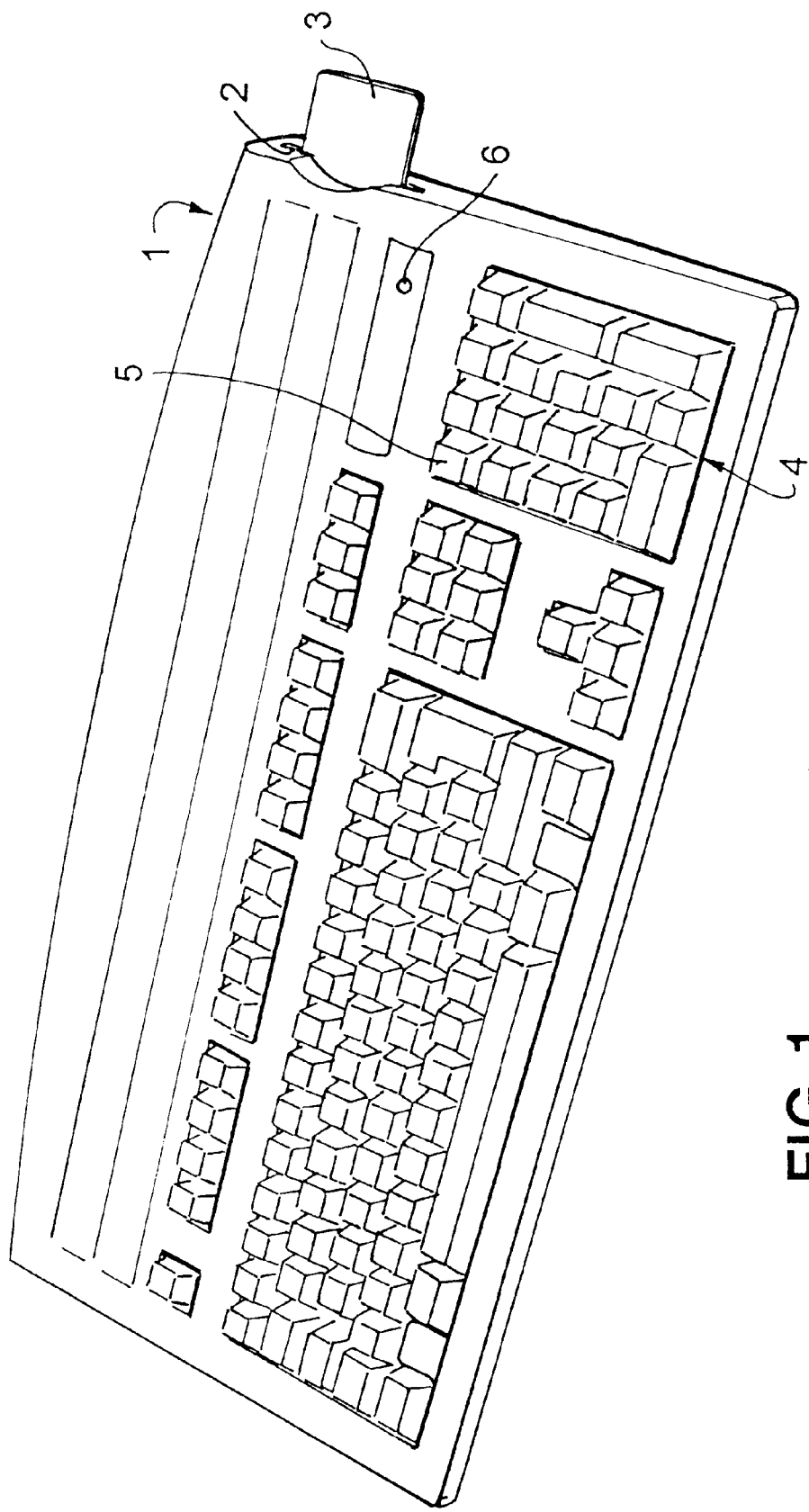
FIG. 1 is a perspective view of a standard IBM PC compatible keyboard console including an integral smart card reader device.

FIG. 1 shows a standard computer keyboard console 1, but including at the top right corner a slot 2 associated with a smart card 3 reader device forming an integral part of the console. A magnetic card reader device may also be located within the keyboard console and located at the upper right hand side comprising a slot, or at the top left hand side of the keyboard console (not shown) for a manual swipe type reader. A barcode reader socket is internal to the keyboard, but the reader itself may be external, such as a barcode laser scanning device, or a slot may be provided for manual insertion printed barcode cards or other optoelectronic card devices if necessary.

A first embodiment of the present invention includes the integration of a magnetic card reader interface 10 and a barcode reader 11 interface into a keyboard console and is shown in its general configuration in FIG. 1. Each device communicates to the host CPU 12 via the keyboard cable 13. The data from each device is converted into standard keyboard codes via the keyboard matrix 14. The integral reader device includes its own EPROM chip 15 and SRAM chip 16 as well as a microprocessor chip 16. The keyboard matrix circuitry, which is standard and need not be described, communicates with the host CPU via the microprocessor and the standard keyboard connection cable 13.

Figure 2:
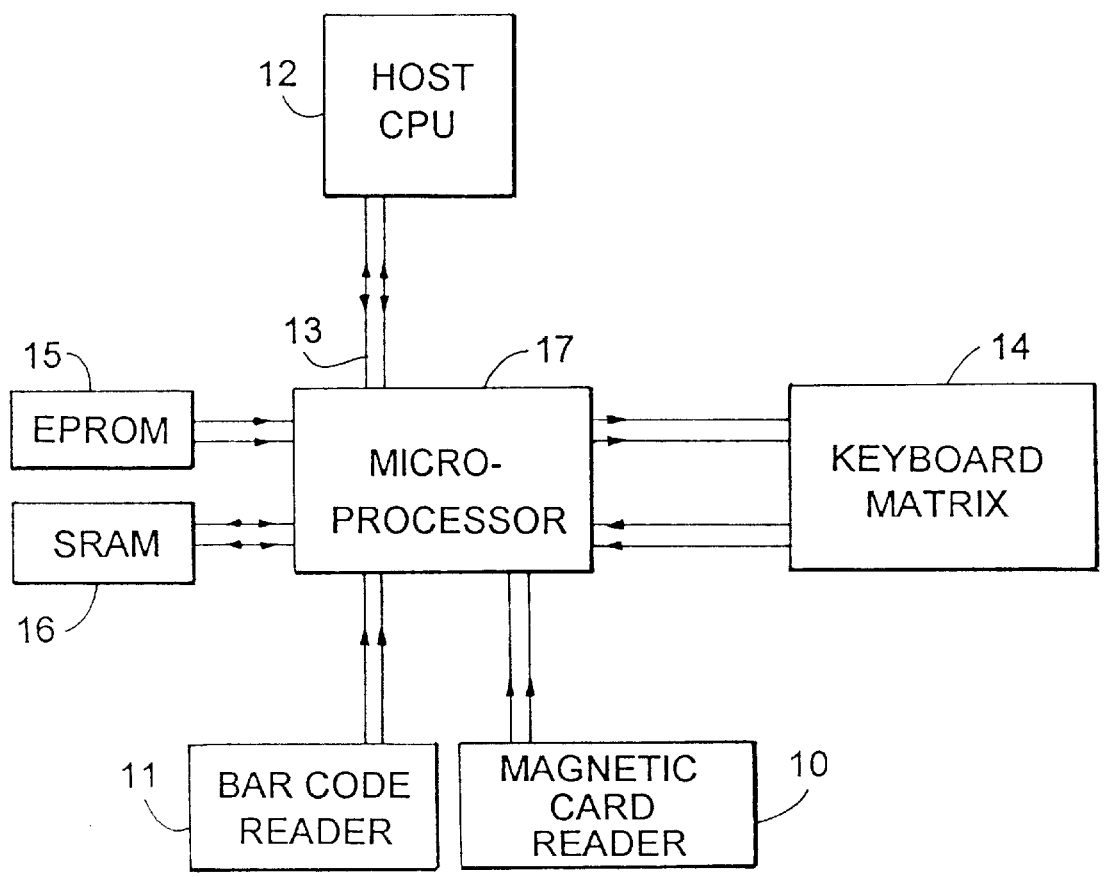
FIG. 2 is a block diagram indicating the general configuration of a first embodiment of the present invention including a magnetic card reader and/or a barcode reader.
Figure 3:
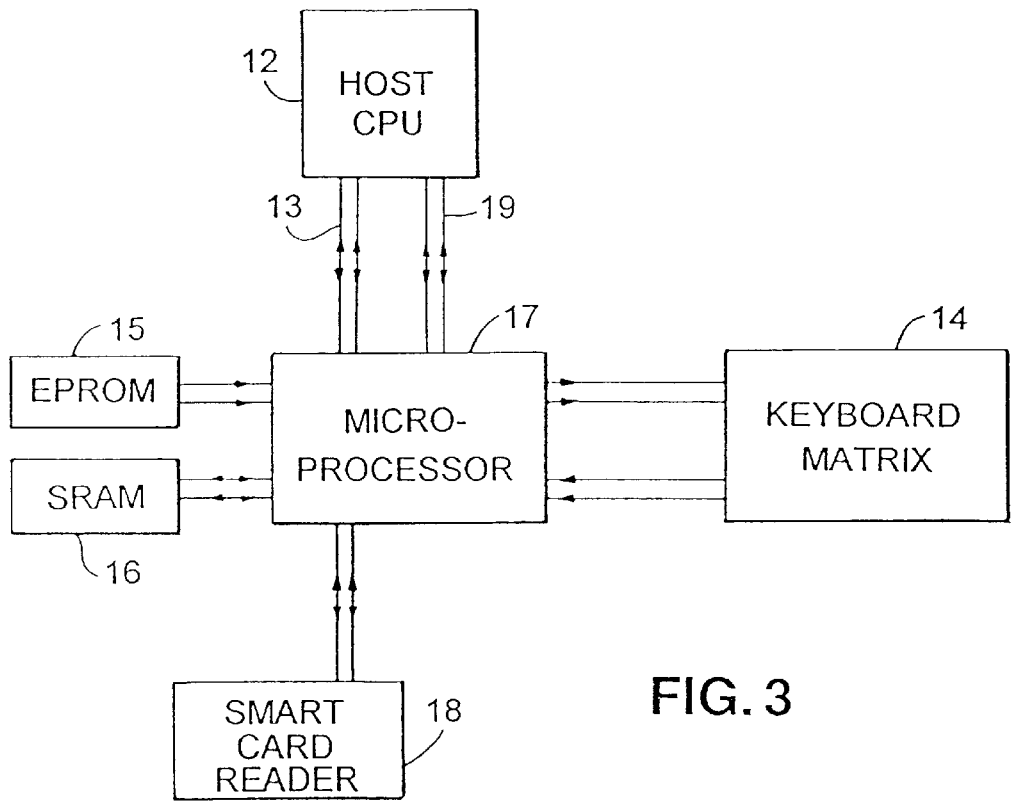
FIG. 3 is a block diagram showing the general configuration of a second embodiment of the present invention, including a smart card reader.

A second embodiment of the present invention is described generally with reference to FIG. 3, which is a similar configuration to that described with reference to FIG. 2, except that this is a specific configuration to integrate a keyboard and a smart card reader interface 18. The keyboard communicates with the host CPU via the keyboard cable and functions as a normal keyboard. However, in this configuration the smart card reader communicates with the host CPU via a separate serial port cable 19. The smart card acceptor slot 2 is situated at the upper right hand side of the keyboard, as shown in FIG. 1.

Figure 4:
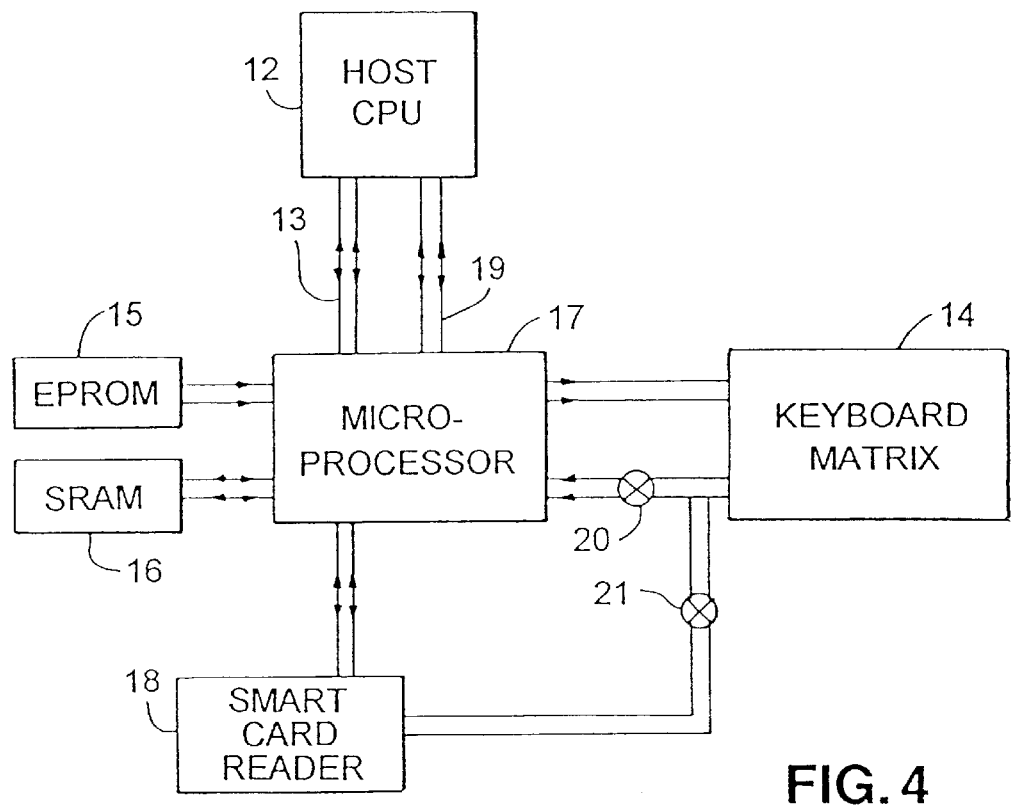
FIG. 4 is a block diagram showing the general configuration of a third embodiment of the present invention including a smart card reader with additional security features.

A third embodiment is shown with reference to FIG. 4, and is a specific integration of a keyboard and smart card reader, with additional security features. One of the main features is that when a user is required to enter a password or PIN, the PIN data never leaves the keyboard. When the user specifies a PIN entry mode (for example by hitting a special PIN entry key), the serial interface between the host CPU and the smart card interface is isolated by means of hardware. This is described further with reference to the embodiments shown in FIGS. 5 and 6. Thus, it is not possible for the host computer or network server to intercept the PIN data by any software means. Communication can be interrupted at one of two points 20,21, between the keyboard matrix/microprocessor link, and/or between the smart card/keyboard matrix link.

The standard numeric key pad section 4 of the keyboard present in all IBM-compatible keyboards, for example, may be modified to incorporate functions for PIN data entry. One possibility is to remove all legends from the key pad except for the numerals, and replace the "NUM LOCK" key legend with "PIN ENTRY" (see key 5, FIG. 1) so that the key pad is dedicated to PIN entry. Another option is to assign an additional PIN entry function to the "NUM LOCK" key so that each depression of the key would cause the keyboard to cycle through separate functions, for example from NUM LOCK "on" to NUM LOCK "off" to PIN ENTRY to NUM LOCK "on". An indication that the keyboard is in PIN entry mode may be provided either by a small display mounted on the keyboard, or a dedicated liquid crystal display (LCD) or light emitting diode (LED) 6 for that function.

Figure 5:
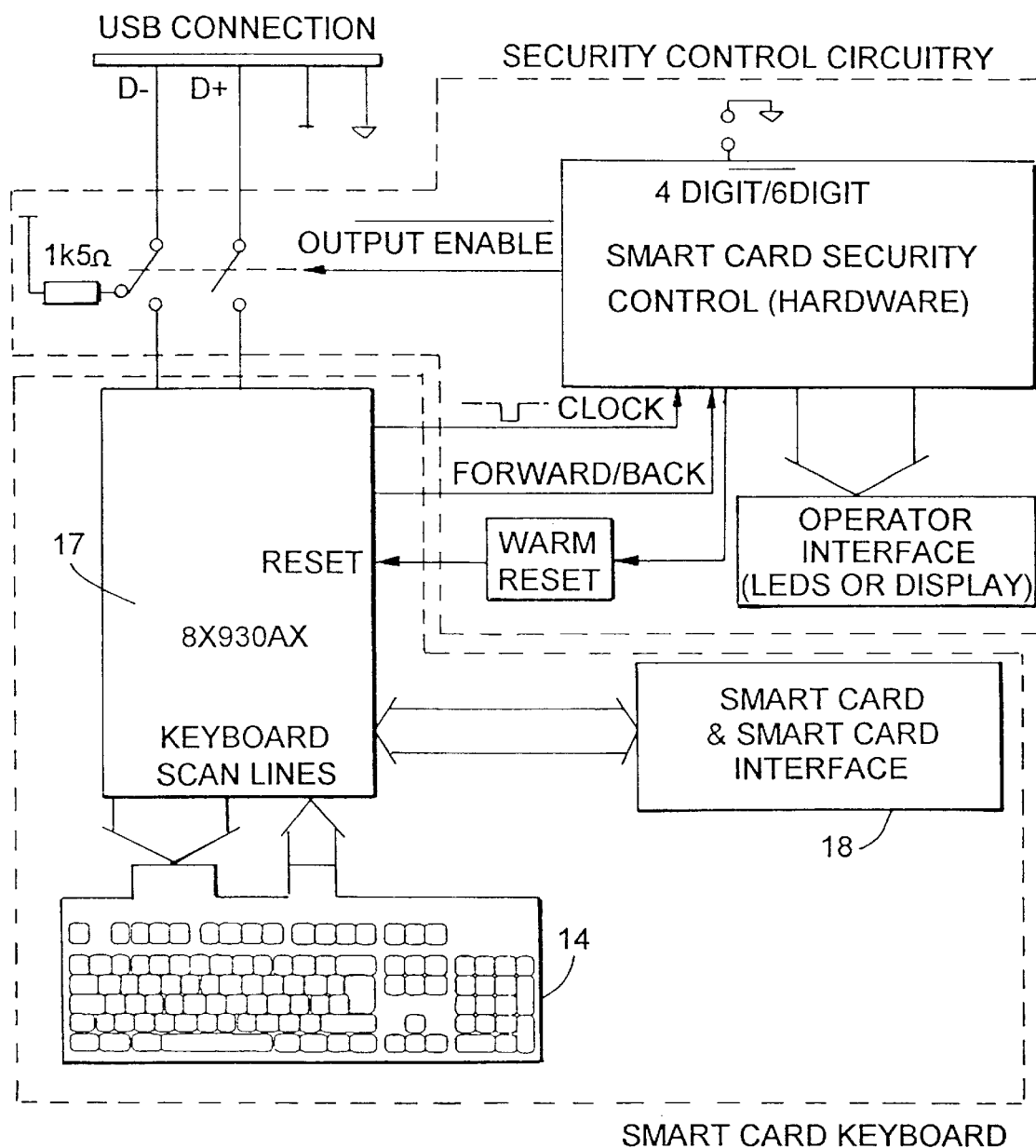
FIG. 5 is a block diagram showing the general configuration of a fourth embodiment of the present invention including a smart card reader with additional security features.

A fourth embodiment will now be described in more detail with reference to FIG. 5. Firstly, connection to the host CPU is via a universal serial bus (USB) interface.

The core security element is that the smart card is locked until a PIN number is validated. In developing the proposed architecture the underlying security principle is that the user, and not the application, controls the switch from "Keyboard Data Mode" to "PIN data mode". To follow this principle the following security criteria may be applied:

The application requests the user to enter PIN data entry mode.

The user and only the user can initiate the actions required to enter PIN DATA entry mode.

The user is informed that the keyboard is in PIN data entry mode by means of a visible indicator or display on the keyboard.

In PIN data entry mode the keyboard interface to the PC is disabled.

In PIN data entry mode, the keyboard controller scans the switch matrix and passes keystroke data to the smart card via a ISO7816 interface.

A "SECURITY SUPERVISOR" State Machine (with no RAM or ROM) controls and monitors the data entry.

On completion of PIN data entry the keyboard controller undergoes a "warm reset" and all PIN data is removed from the microcontroller memory prior to re-establishing the USB link to the PC.

The following key entry data is supported by the SECURITY SUPERVISOR in PIN DATA ENTRY mode:

Num. Lock [operator confirmation], 0 to 9 numeric keys

DEL. [error correction]

Enter key.

The Security Supervisor implemented as a clock mode sequential circuit (in ASIC) is installed above the 'Normal keyboard functionality' controlling PIN DATA entry through the following steps:

A: From "the reset state", the PCE-procedure only starts after receiving input from the host via USB-channel.

B: Start of PCE-procedure to be approved/confirmed by user.

C: The switching of USB interface lines to Idle state condition for low speed communication devices after (B) and before re-initialisation of all RAM memory.

D: Outputting via LED indicators/display of clear operator instructions.

E: State table control as per following sequence:
  0: State table level
  1: Reset state PCE-procedure request [after A]
  2: Secure mode confirmation [after B and C]
  3: First of 4 PIN-digit entry
  4: Second of 4 PIN-digit entry
  5: Third of 4 PIN-digit entry
  6: Fourth of 4 PIN-digit entry
  7: End of PCE-procedure [back to reset state]

F: Warm reset output to the dedicated microprocessor (eg. 8×930×) after end of procedure.

G: Switching back onto USB interface after completion of warm reset firmware module.

A fifth embodiment will now be described in more detail with reference to FIG. 6.

When the device enters "PIN Entry Mode", a separate security module takes control of the switch matrix of the keyboard, so that any key presses are not detected by the keyboard controller. Instead, the matrix scan lines are redirected to the security module, under the control of the security module. The same control at the same time switches the connection between the keyboard controller and the smart card, over to between the security module and the smart card. All communications between the keyboard controller and the security module will be one-way, i.e. from the keyboard controller to the security module, determined by the hardware so that the PIN cannot be passed from the security module to the keyboard controller by a "trap door" or any other means. The security module is embodied as a separate dedicated microprocessor.

It should be noted that;

A closed switch can be provided on the matrix so the USB controller knows when control of the matrix has been passed back to it from the security module.

It is possible to add a simple circuit to let the USB microprocessor know when there has been a keypress in PIN Entry mode, without letting it know exactly which key has been pressed.

Figure 6:
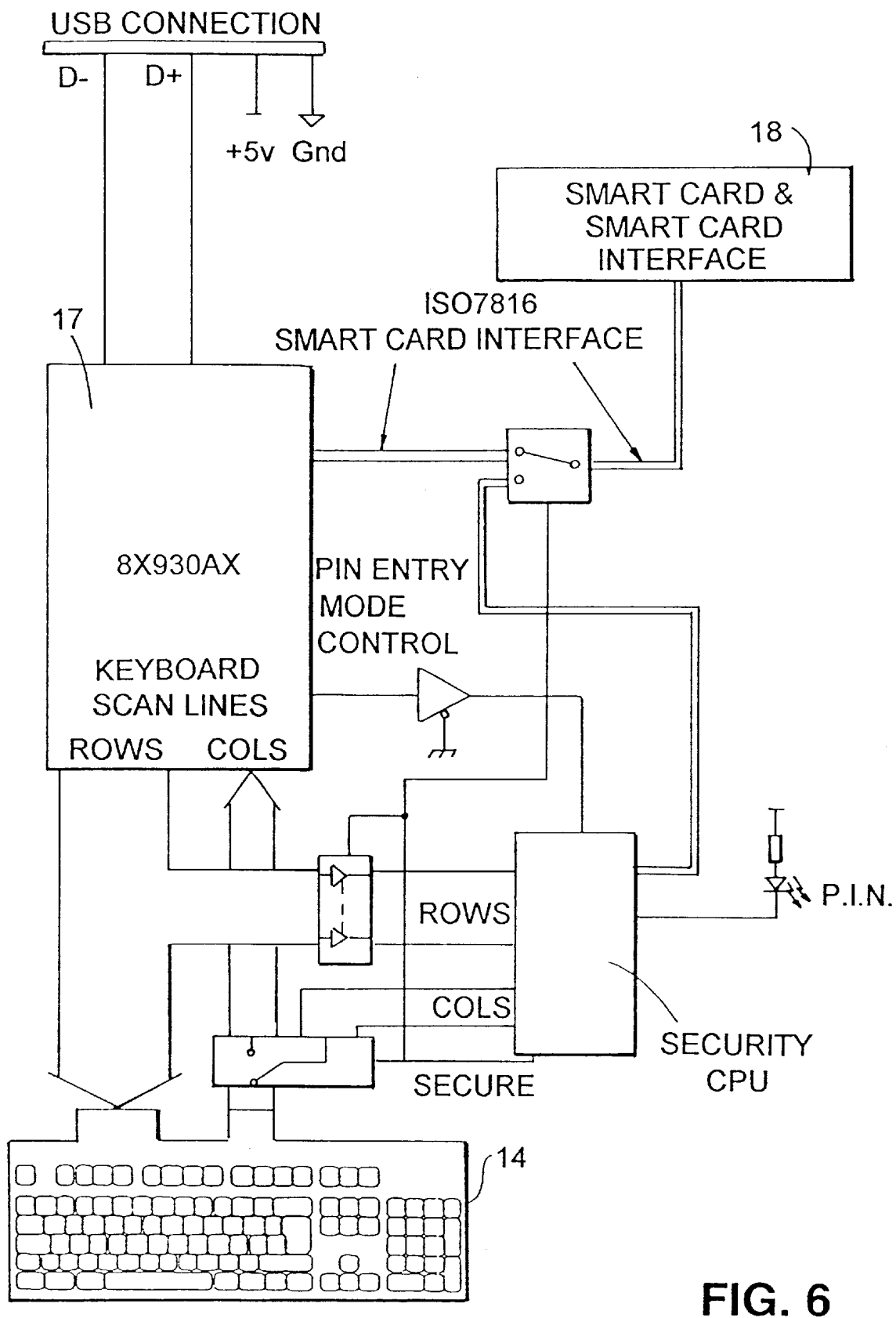
FIG. 6 is a block diagram showing the general configuration of a fifth embodiment of the present invention including a smart card reader with additional security features.

The following represents a "state table" for the configuration shown in FIG. 6.

| Host | 930 USB Controller | Security Module |
|---|---|---|
| PIN Entry Request | | |
| | Go into PIN Entry mode | |
| | Activate PIN Entry control | |
| | Maintain USB Link & & scan matrix to determine when secure mode is complete | Switch into secure mode |
| | | Wait until PIN Entry key is pressed, whle PIN Entry mode is active, with timeout |
| | | PIN inidicator ON |
| | | Scan matrix & get PIN code |
| | | send PIN to card |
| | | PIN Entry key pressed |
| | | PIN indicator Off |
| | | Switch out of secure mode |
| | Detect exit from secure mode | |
| | Send PIN Entry complete to host. Note: -this does not guarantee access to the card, the PIN might be incorrect. | |
| PC application shall determine whether it has access to the card. | | |

Physical security is provided by means of a tamper proof label covering one of the keyboard assembly screws so that the user can identify if the keyboard itself has been interfered with.

Additional applications in which a smart card may be used which contains personal data in encrypted form, may include the transmission of encryption keys, the transmission of personal data including medical record data, as well as access control to a network environment, simple boot control may be provided, for example to allow certain users in an office or home environment to boot up a PC.

It will readily be apparent to those skilled in the art that many other applications are possible for the keyboard of the present invention, in particular in electronic commerce and banking applications, especially Internet commerce. Also while the embodiments described herein are illustrative of the invention, other modes of implementation of the invention will be apparent to those skilled in the art, which are both within the spirit and scope of the invention and which will fall within the scope of the claims which follow.

We claim:

1. A computer keyboard console configured to be in communication with a central processing unit in a locally connected host computer, and including keyboard matrix circuitry and an integral transaction card device reader housed within said console, said integral transaction card device reader configured to read a transaction card comprising an encoded data storage medium and being adapted to be inserted into a slot defined by said keyboard console, wherein said reader comprises, an interface adjacent said slot configured and in communication with a dedicated microprocessor within said keyboard console so as to read encoded data stored on said transaction card, said dedicated microprocessor being configured and in communication with erasable data storage means within said keyboard console and adapted to locally store, compare and validate security data read from said transaction card, said dedicated microprocessor being configured to take control of the keyboard matrix circuitry away from said central processing unit for comparing keystroke input data with said stored data, and said dedicated microprocessor being configured to return control of said keyboard matrix circuitry to said central processing unit in said locally connected host computer via a standard external connection.

2. A computer keyboard console according to claim 1, wherein the transaction card device reader is selected from the group comprising one or more of, a barcode device reader, a printed barcode card reader, a magnetic card reader, and a smart card reader, and wherein separate respective reader interfaces may be provided and configured with the dedicated microprocessor to read respective different transaction card devices when inserted in the keyboard console.

3. A computer keyboard console including keyboard matrix circuitry configured to be in circuit communication with a central processing unit in a locally connected host computer and an integral smart card reader housed within said console, said console defining a slot for insertion of a smart card, wherein said reader comprises, an interface adjacent to said slot configured and in communication with a dedicated microprocessor within said console so as to read encoded data and security data stored on said smart card, said dedicated microprocessor being configured and in communication with erasable data storage means, for locally storing, comparing and validating said security data read from said smart card, said dedicated microprocessor being configured in communication with the keyboard matrix circuitry for comparing keystroke input data with said stored data, and further comprising blocking means for blocking communication of said security data, when entered either via said smart card or via keystroke on the keyboard, between the keyboard console and said central processing unit in said locally connected host computer.

4. A keyboard console according to claim 3, including an allocated function key, the function of which is to signify the commencement of keystrokes defining security data input.

5. A keyboard console according to claim 4, wherein said allocated function key is a "NUM LOCK" key, and wherein said security data input comprises numerical data defining a personal identification number (PIN).

6. A computer keyboard console configured to be in communication with a central processing unit in a locally connected host computer, including an integral smart card reader housed within said keyboard console, said keyboard console defining a slot for insertion of said smart card, wherein said reader comprises, an interface adjacent said slot configured and in communication with a dedicated microprocessor within said keyboard console so as to read encoded data stored on said smart card, said dedicated microprocessor being configured and in communication with a state machine with no random access memory or read only memory for controlling and monitoring security data entry from said smart card and said keyboard console, said dedicated microprocessor being configured and in communication with keyboard matrix circuitry, means to switch control of keyboard function from said host computer central processing unit to said dedicated microprocessor to change from normal data entry to security data entry, and associated means to lock the smart card function, until security data input via user keystrokes has been passed to the smart card and validated, means to return control of keyboard function to said host computer central processing unit, following a successful validation procedure, said dedicated microprocessor being configured to be in communication with said host computer central processing unit via a universal serial bus connection.

7. A computer keyboard console according to claim 6, wherein said means to return control of keyboard function comprises a warm reset, all security data being erased from a microcontroller memory before the link with the host computer central processing unit (CPU) is re-established.

8. A computer keyboard console including an integral smart card reader housed within said console, said console defining a slot for insertion of said smart card, wherein said reader comprises, an interface adjacent to said slot configured and in communication with a dedicated microprocessor within said keyboard console so as to read encoded data stored on said smart card, said dedicated microprocessor being configured and in communication with the keyboard matrix controller circuitry for comparing keystroke input data with said stored data, said keyboard matrix controller circuitry being in one-way communication with a security module, said security module taking control of the matrix scan lines during security data entry via pre-determined keystrokes, so that keystrokes are not detected by the keyboard matrix controller circuitry, and at the same time switching the connection between the keyboard matrix controller circuitry and the smart card over to between the security module and the smart card, said dedicated microprocessor being configured to be in communication with a locally connected host computer central processing unit (CPU) via a universal serial bus connection.

9. A computer keyboard console according to claim 8, wherein said security module comprises a separate dedicated microprocessor.

* * * * *